(12) United States Patent
Montgomery et al.

(10) Patent No.: US 11,753,987 B2
(45) Date of Patent: Sep. 12, 2023

(54) SPRING PRELOAD FOR TRACTION DRIVE

(71) Applicant: SuperTurbo Technologies, Inc., Loveland, CO (US)

(72) Inventors: Marc Montgomery, Loveland, CO (US); Jared Howe, Loveland, CO (US); Ryan Sherrill, Loveland, CO (US)

(73) Assignee: SuperTurbo Technologies, Inc., Loveland, CO (US)

( * ) Notice: Subject to any disclaimer, the term of this patent is extended or adjusted under 35 U.S.C. 154(b) by 98 days.

(21) Appl. No.: 17/675,772

(22) Filed: Feb. 18, 2022

(65) Prior Publication Data

US 2022/0307411 A1    Sep. 29, 2022

Related U.S. Application Data

(60) Provisional application No. 63/214,630, filed on Jun. 24, 2021, provisional application No. 63/164,812, filed on Mar. 23, 2021.

(51) Int. Cl.
| | |
|---|---|
| *F02B 39/04* | (2006.01) |
| *F02B 37/10* | (2006.01) |
| *F16H 13/14* | (2006.01) |
| *F16H 13/08* | (2006.01) |

(52) U.S. Cl.
CPC ............ *F02B 39/04* (2013.01); *F02B 37/105* (2013.01); *F16H 13/14* (2013.01); *F16H 13/08* (2013.01)

(58) Field of Classification Search
CPC ........ F02B 39/04; F02B 37/105; F16H 13/14; F16H 13/08
USPC ...................................... 475/169
See application file for complete search history.

(56) References Cited

U.S. PATENT DOCUMENTS

| | | | | |
|---|---|---|---|---|
| 3,367,214 | A * | 2/1968 | Nasvytis | F16H 13/08 475/183 |
| 2012/0000446 | A1 * | 1/2012 | Venton-Walters | F02B 33/36 474/94 |

* cited by examiner

*Primary Examiner* — Colby M Hansen
(74) *Attorney, Agent, or Firm* — Cochran Freund & Young LLC; William W. Cochran

(57) ABSTRACT

Disclosed is a spring for preload in a planetary traction drive designed for a driven turbocharger on an engine. The ring roller of the planetary traction drive has two parts with a spring between the two parts for generating a preload force on the ring roller assembly of the planetary traction drive. The spring provides a spreading force on the ring roller, and allows for setting a desired preload force on the traction surfaces of the traction drive during assembly and operation, even with variations in manufacturing of the different parts of the traction drive.

28 Claims, 10 Drawing Sheets

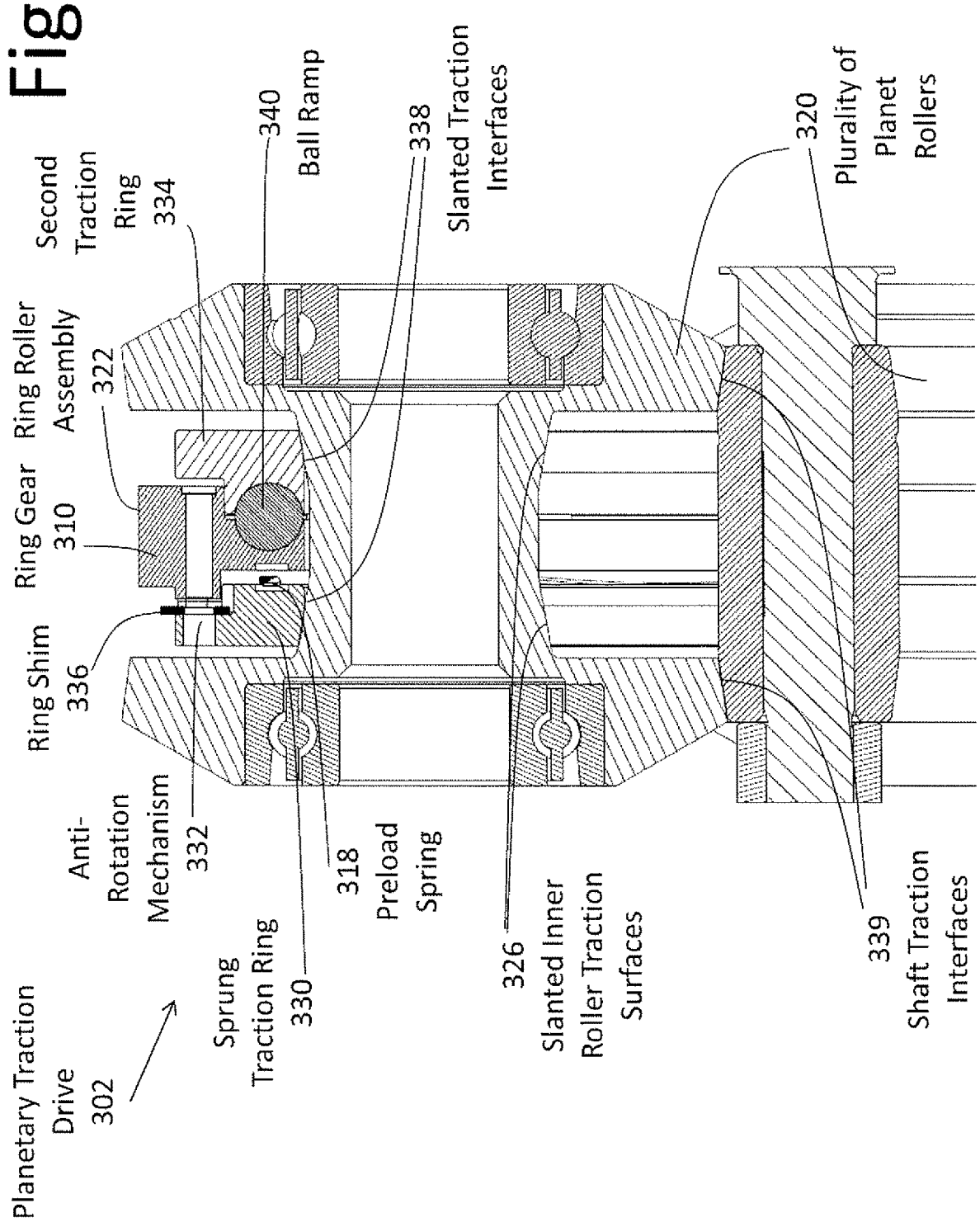

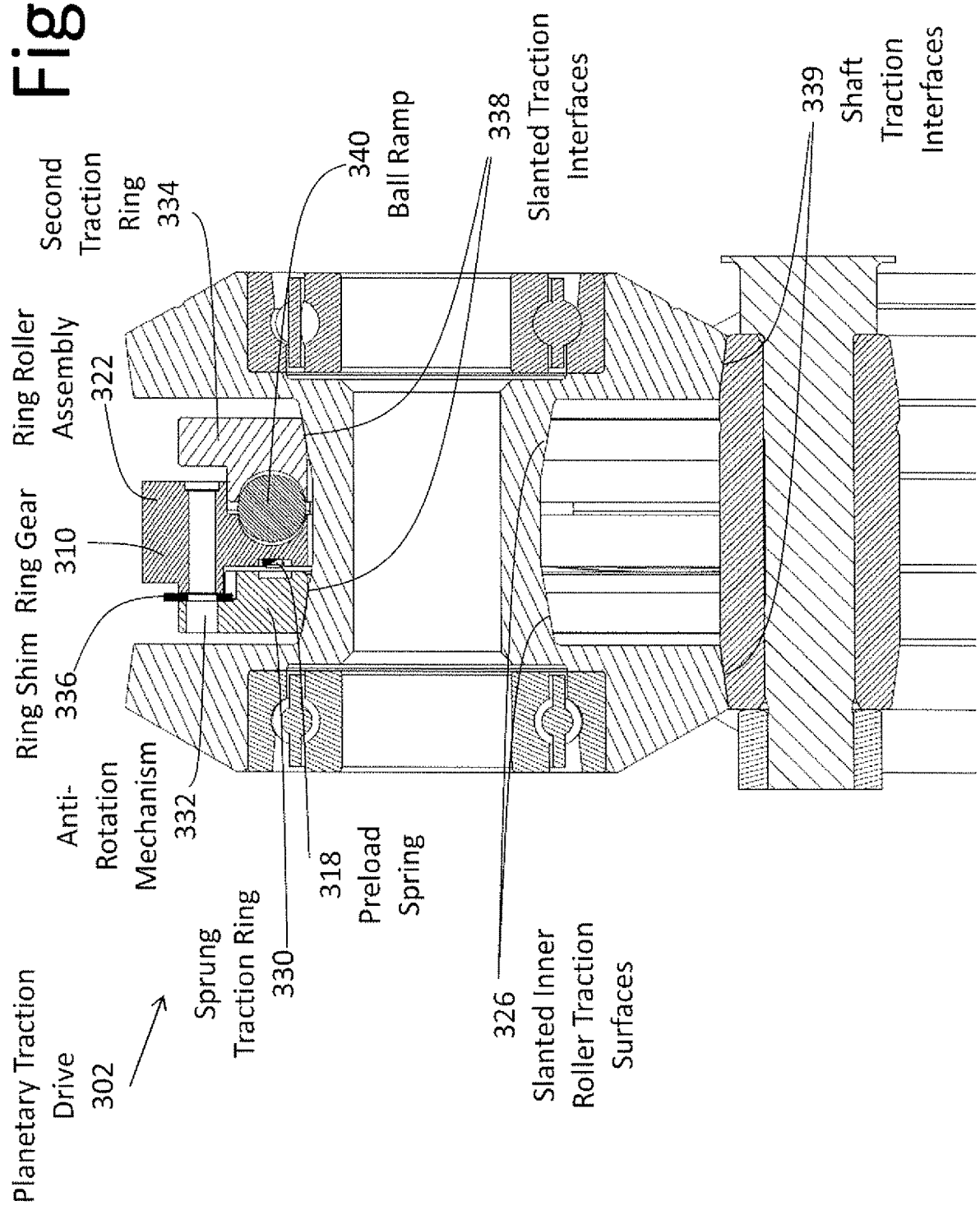

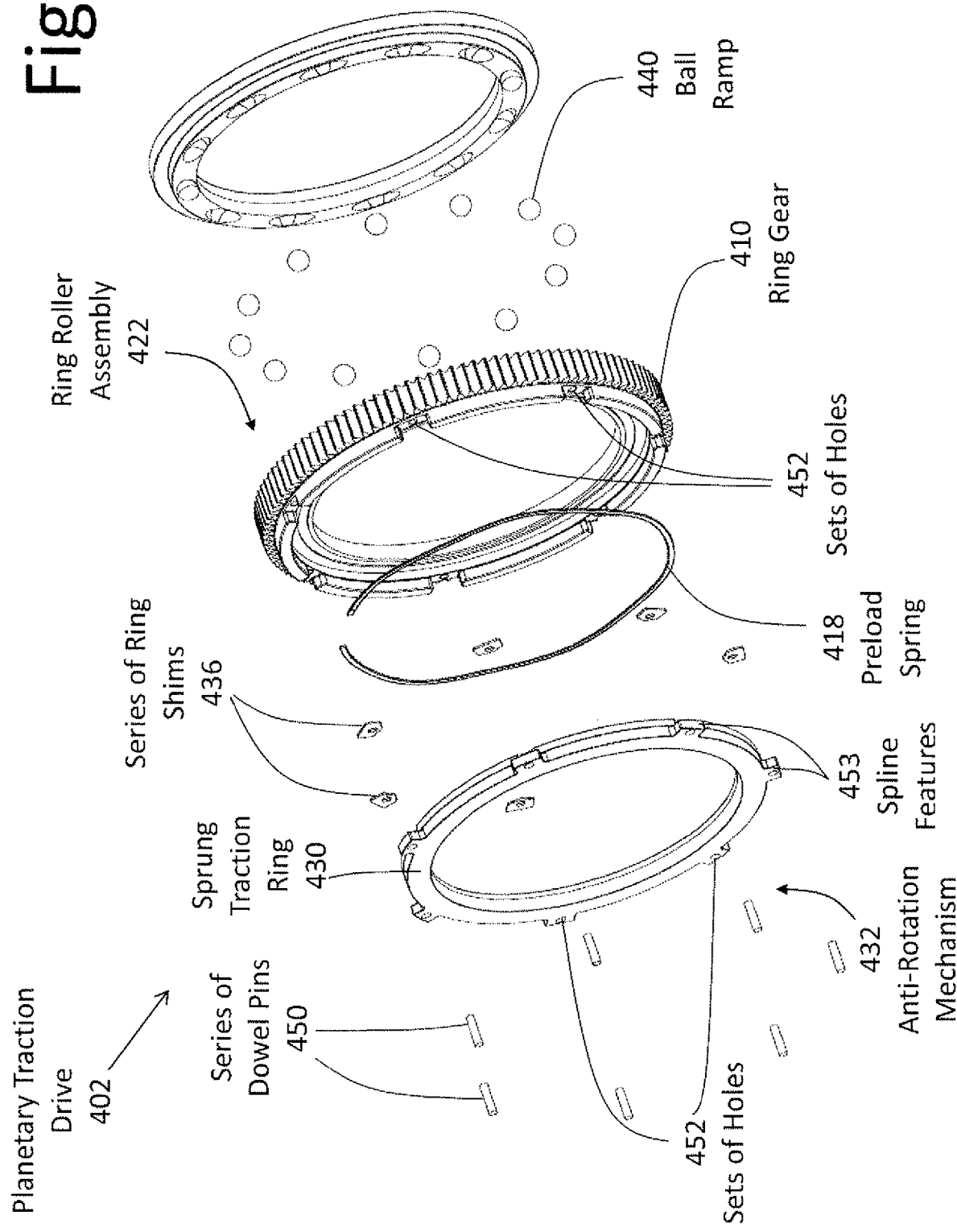

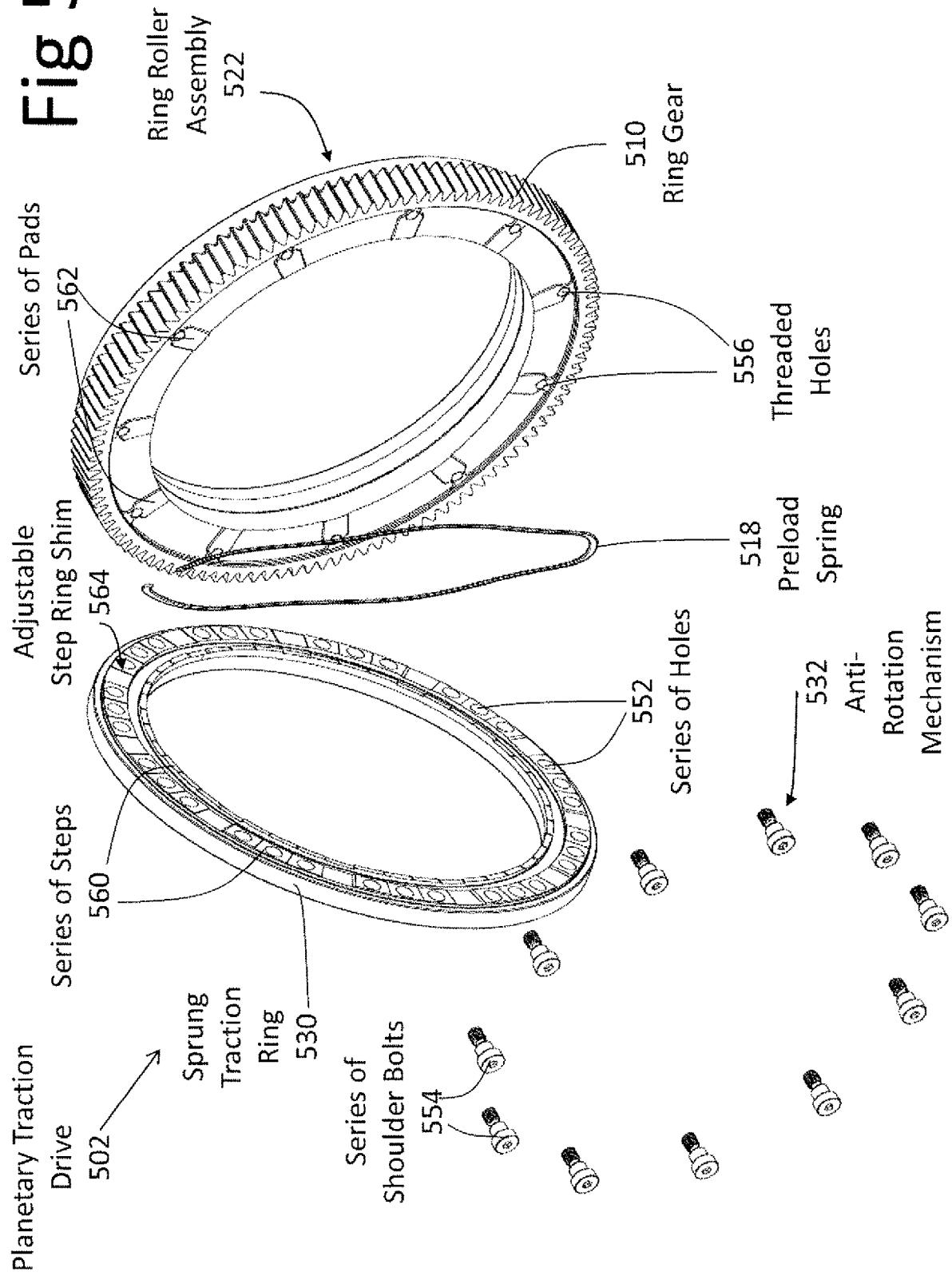

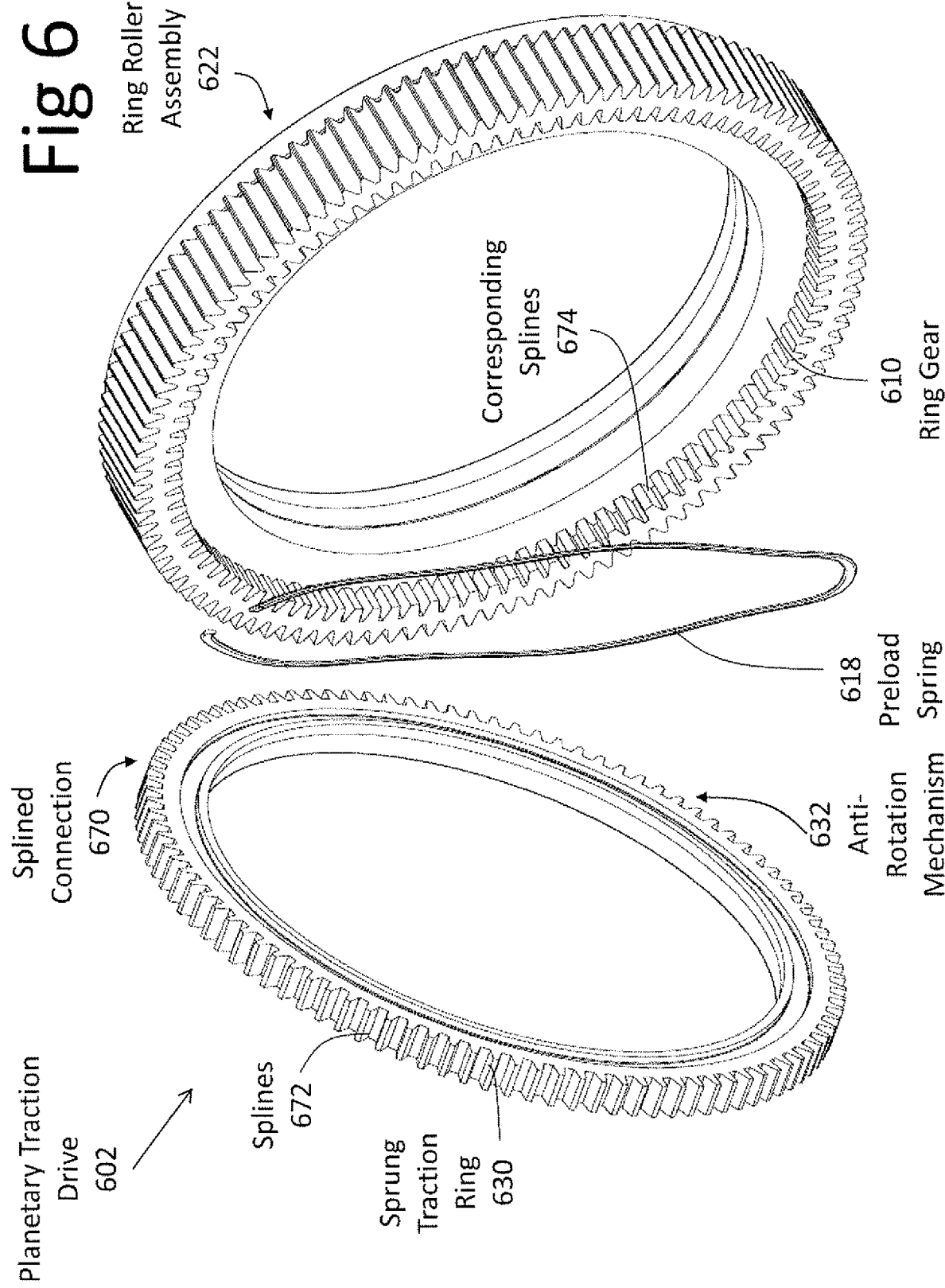

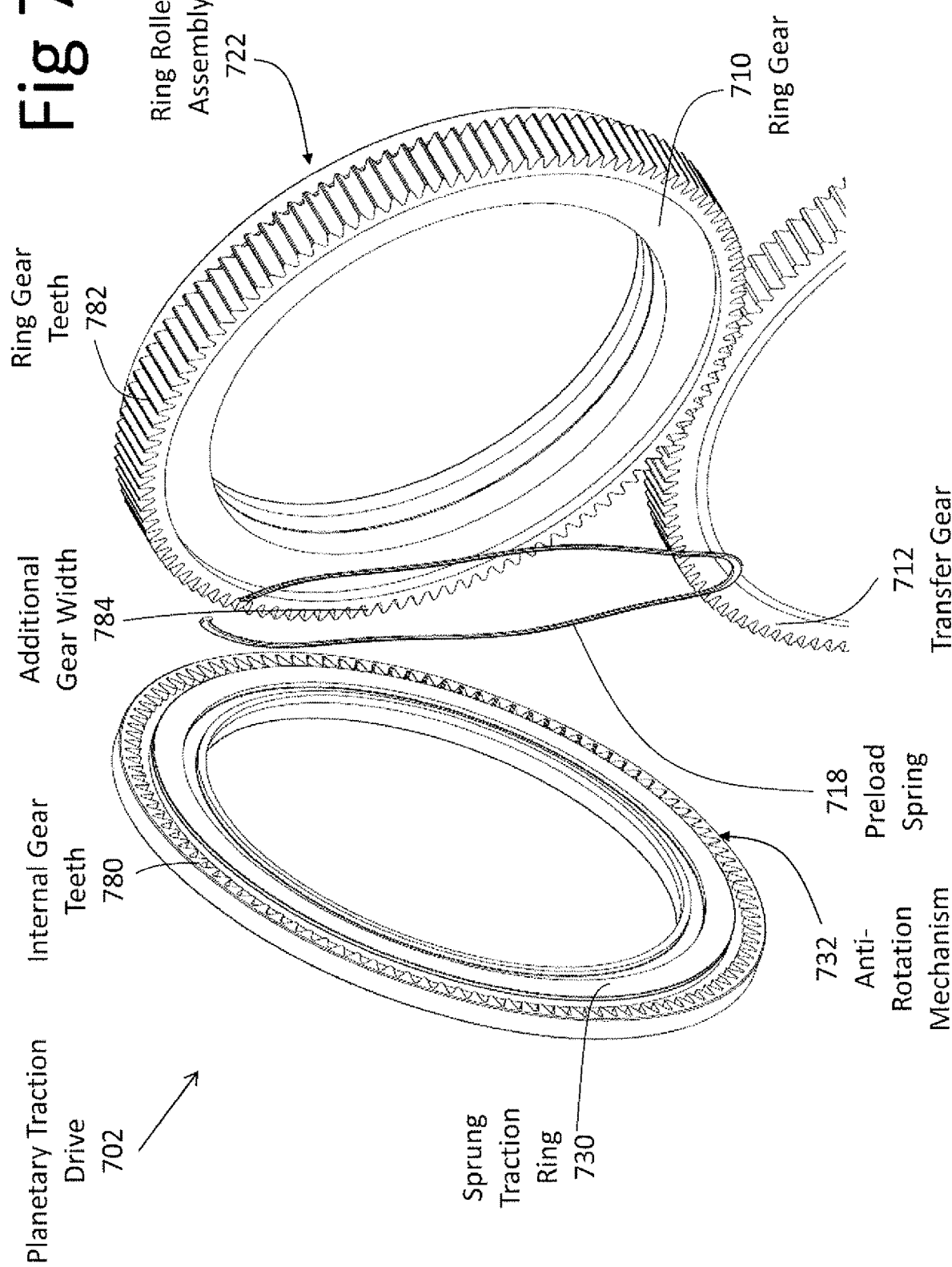

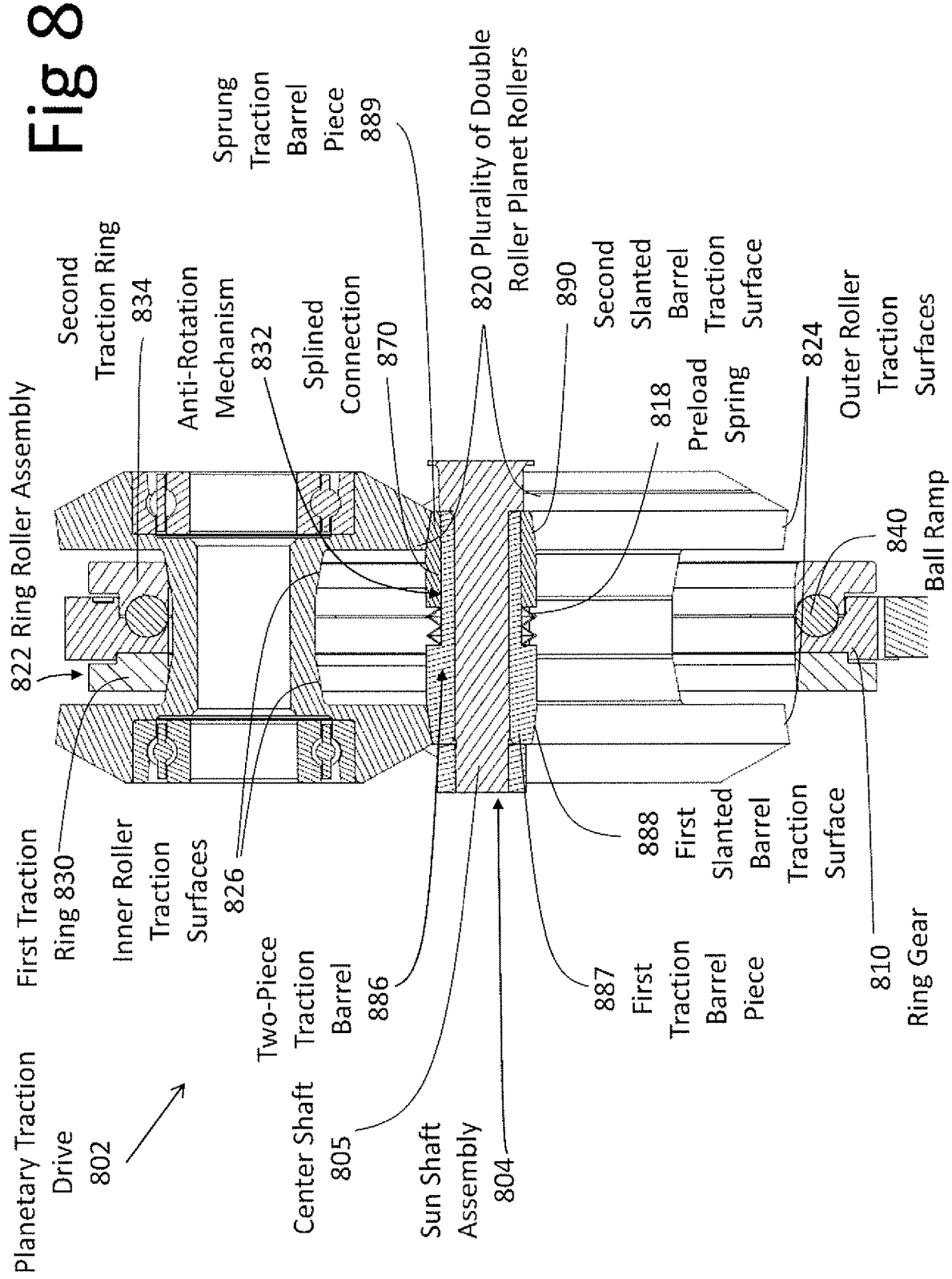

SPRING PRELOAD FOR TRACTION DRIVE

CROSS-REFERENCE TO RELATED APPLICATIONS

This Non-Provisional patent application claims the benefit of the U.S. Provisional Patent Application No. 63/164,812, entitled "Adjustable Ring Shim for Traction Drive," which was filed with the U.S. Patent & Trademark Office on Mar. 23, 2021, and the U.S. Provisional Patent Application No. 63/214,630, entitled "Spring Preload for Traction Drive," filed on Jun. 24, 2021, all of which are specifically incorporated herein by reference for all that they disclose and teach.

BACKGROUND

Driven turbochargers are an improvement over normal turbochargers since driven turbochargers (super-turbochargers) are powered by more than just the exhaust gas turbine, which reduces turbo-lag in boosted engines. Driven turbochargers can also direct excess turbine power back to the engine to increase engine efficiency. One class of driven turbocharger utilizes a planetary traction drive that interfaces with the turbo shaft to provide torque to and from the turbo shaft.

SUMMARY

An embodiment of the present invention may therefore comprise a planetary traction drive comprising: a sun shaft; a plurality of planet rollers with outer roller traction surfaces that interface with the sun shall; a ring roller assembly comprising: a ring gear; a sprung traction ring and a second traction ring located concentrically with said ring gear that interface with slanted inner roller traction surfaces of the plurality of planet rollers; a preload spring located between the ring gear and the sprung traction ring that provides a preload force on the slanted inner roller traction surfaces of the plurality of planet rollers during assembly and operation of the planetary traction drive; an anti-rotation mechanism that connects the sprung traction ring and the ring gear such that the sprung traction ring can slide axially on the anti-rotation mechanism wherein the anti-rotation mechanism transmits torque between the sprung traction ring and the ring gear.

An embodiment of the present invention may therefore further comprise a method of setting a preload in a planetary traction drive comprising: interfacing outer roller traction surfaces of a plurality of planet rollers with a sun shaft; assembling a ring roller assembly comprising a ring gear, a sprung traction ring, and a second traction ring; interfacing the sprung traction ring and the second traction ring with slanted inner roller traction surfaces of the plurality of planet rollers; placing a preload spring between the ring gear and the sprung traction ring that provides a preload force on the slanted inner roller traction surfaces of the plurality of planet rollers during assembly and operation of the planetary traction drive; connecting the sprung traction ring and the ring gear through an anti-rotation mechanism such that the sprung traction ring can slide axially on the anti-rotation mechanism wherein the anti-rotation mechanism transmits torque between the sprung traction ring and the ring gear.

An alternative embodiment of the present invention may therefore comprise a planetary traction drive comprising: a sun shaft assembly comprising: a center shaft; a two-piece traction barrel located around the center shaft and concentric to the center shaft and connected to rotate with the center shall, the two-piece traction barrel comprising: a first traction barrel piece with a first slanted barrel traction surface that is connected to the center shaft: a sprung traction barrel piece with a second slanted barrel traction surface that is coupled to the first traction barrel piece through an anti-rotation mechanism that allows the sprung traction barrel piece to slide axially on the anti-rotation mechanism and transmit torque between the sprung traction barrel piece and the first traction barrel piece; a preload spring located between the first traction barrel piece and the sprung traction barrel piece that provides a preload force on the first slanted barrel traction surface and the second slanted barrel traction surface during assembly and operation of the planetary traction drive; a plurality of double roller planet rollers with outer roller traction surfaces that interface with the first slanted barrel traction surface and the second slanted barrel traction surface of the sun shaft assembly; a ring roller assembly comprising: a ring gear; a first traction ring and a second traction ring located concentrically with the ring gear that interface with inner roller traction surfaces of the plurality of double roller planet rollers.

An alternative embodiment of the present invention may therefore comprise a planetary traction drive comprising: a sun shaft; a plurality of double roller planet roller assemblies, each double roller planet assembly comprising: a sprung planet roller and a second planet roller rotationally coupled together concentrically through an anti-rotation mechanism that allows the sprung planet roller to slide axially on the anti-rotation mechanism while transmitting torque between the sprung planet roller and the second planet roller, where both sprung planet roller and second planet roller have outer roller traction surfaces that interface with the sun shaft, as well as slanted inner roller traction surfaces; a preload spring located externally to the sprung planet roller that provides a preload force on the slanted inner roller traction surfaces of the sprung planet roller and the second planet roller during assembly and operation of the planetary traction drive; a ring roller assembly comprising: a ring gear; a first traction ring and a second traction ring located concentrically with the ring gear that interface with the slanted inner roller traction surfaces of the sprung planet rollers and the second planet rollers of the plurality of double roller planet roller assemblies.

BRIEF DESCRIPTION OF THE DRAWINGS

FIG. 3A is a cross section of an embodiment of a planetary traction drive with a preload spring and a ball ramp integrated into the ring roller assembly with the preload spring providing clamping force in the planetary traction drive.

FIG. 3B is a cross section of the embodiment of a planetary traction drive from FIG. 3A with a preload spring and a ball ramp integrated into the ring roller assembly with the ball ramp providing clamping force in the planetary traction drive.

FIG. 4 is an exploded view of an embodiment of a ring roller assembly for a planetary traction drive where the anti-rotation mechanism in the ring roller assembly is comprised of a series of dowel pins.

FIG. 5 is an exploded view of an embodiment of a ring roller assembly for a planetary traction drive where the anti-rotation mechanism in the ring roller assembly is comprised of a series of shoulder bolts.

FIG. 6 is an exploded view of an embodiment of a ring roller assembly for a planetary traction drive where the anti-rotation mechanism in the ring roller assembly is comprised of a splined connection between the sprung traction ring and the ring gear.

FIG. 7 is an exploded view of an embodiment of a ring roller assembly for a planetary traction drive where the anti-rotation mechanism in the ring roller assembly is comprised of internal gear teeth formed on the sprung traction ring that mate with ring gear teeth on the ring gear.

FIG. 8 is a cross section of an alternative embodiment of a planetary traction drive with a preload spring integrated into a two-piece traction barrel of a sun shaft assembly.

DETAILED DESCRIPTION OF THE EMBODIMENTS

Figure 1:
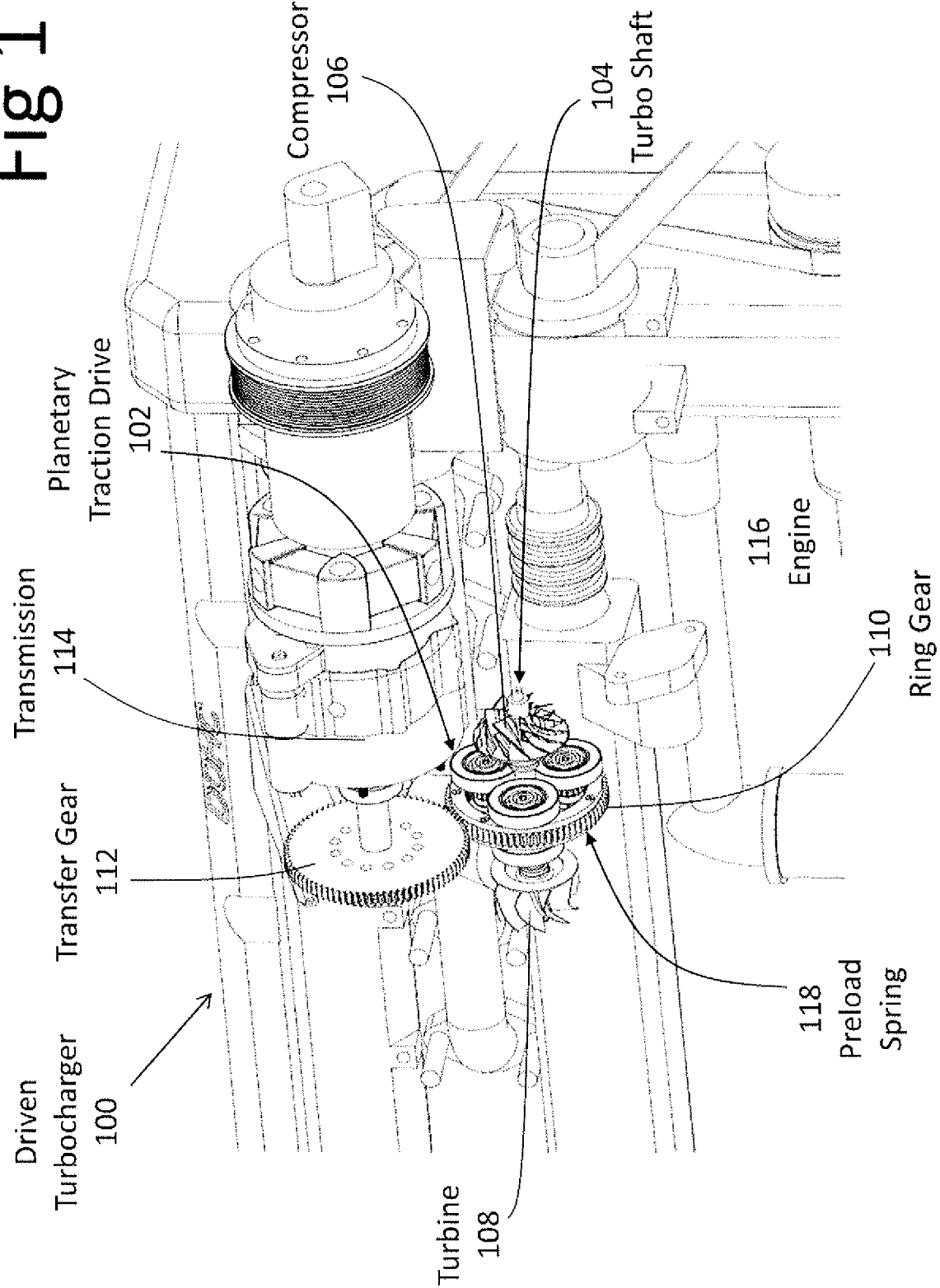
FIG. 1 is an isometric view of a driven turbocharger with a planetary traction drive coupled to an engine.

FIG. 1 is an isometric view of a driven turbocharger 100 with a planetary traction drive 102 coupled to an engine 116. The operation of driven turbocharger 100 is as taught in U.S. Pat. No. 8,561,403, issued Oct. 22, 2013, entitled "Super-Turbocharger Having a High Speed Traction Drive and a Continuously Variable Transmission," U.S. Pat. No. 8,668,614, issued Mar. 11, 2014, entitled "High Torque Traction Drive," U.S. Pat. No. 9,670,832, issued Jun. 6, 2017, entitled "Thrust Absorbing Planetary Traction Drive SuperTurbo," U.S. Pat. No. 10,539,159, issued Jan. 21, 2020, entitled "Two-Piece Shaft Assembly for Driven Turbocharger," and U.S. Pat. No. 10,655,711, issued May 19, 2020, entitled "Single Angular Contact Ball Ramp For Driven Turbocharger." U.S. Pat. Nos. 8,561,403, 8,668,614, 9,670,832, 10,539,159, and 10,655,711 are specifically incorporated herein by reference for all that they disclose and teach. Driven turbocharger 100 comprises a turbo shaft 104 with a compressor 106 attached to one end and a turbine 108 attached to the other end. Planetary traction drive 102 interfaces with turbo shaft 104 to transmit torque to and from turbo shaft 104. Ring gear 110 acts as a low-speed output of planetary traction drive 102 and meshes with transfer gear 112. Transfer gear 112 is coupled to transmission 114 which transmits torque between driven turbocharger 100 and engine 116. Turbo shaft 104 is a sun shaft of planetary traction drive 102, and attaching turbine 108 and compressor 106 to turbo shaft 104, and coupling transmission 114 to ring gear 110 through transfer gear 112 forms driven turbocharger 100, as power transfer between engine 116 and turbine 108 and compressor 106 is enabled. During assembly and operation, it is necessary to set a preload on planetary traction drive 102 in order provide force on each traction interface to enable planetary traction drive 102 to transmit torque properly. The present invention uses a preload spring 118 to set this preload during assembly and maintain the preload during operation in a way that can account for variations in manufacturing of the different parts of planetary traction drive 102.

Figure 2:
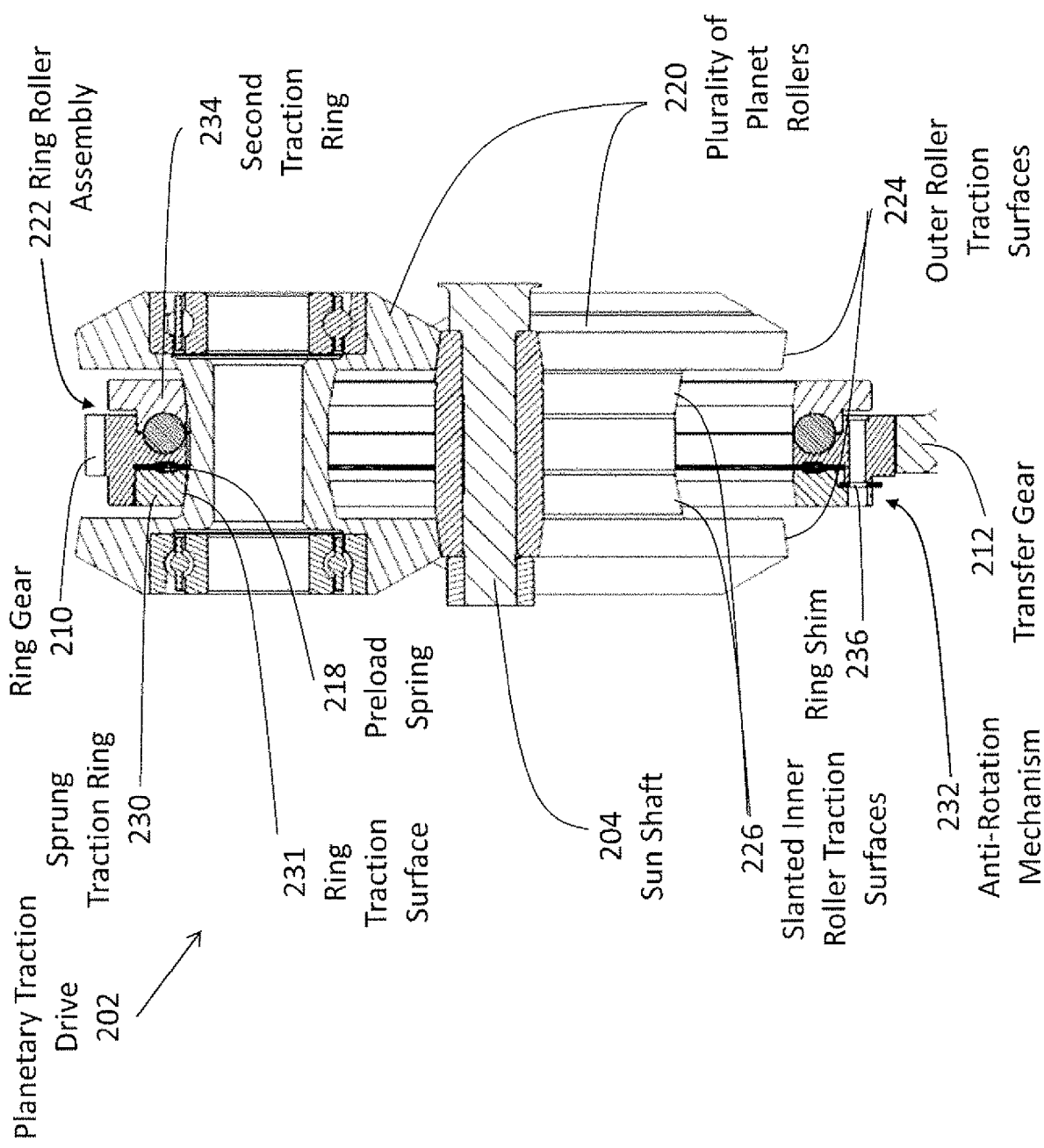
FIG. 2 is a cross section of an embodiment of a planetary traction drive with a preload spring located in a ring roller assembly.

FIG. 2 is a cross section of an embodiment of a planetary traction drive 202 with a preload spring 218 located in a ring roller assembly 222. Planetary traction drive 202 is comprised of a sun shaft 204, which corresponds to turbo shaft 104 of FIG. 1, a plurality of planetary rollers 220, and a ring roller assembly 222. Plurality of planetary rollers 220 have outer roller traction surfaces 224 that interface with sun shaft 204 to transmit torque to and from sun shaft 204. Sun shaft 204 may also be comprised of a center shaft and a traction barrel as taught in U.S. Pat. No. 10,539,159, issued Jan. 21, 2020, entitled "Two-Piece Shaft Assembly for Driven Turbocharger." Ring roller assembly 222 comprises a ring gear 210 as well as a sprung traction ring 230 and a second traction ring 234 located concentrically with ring gear 210 that interface with slanted inner roller traction surfaces 226 of plurality of planet rollers 220. Sprung traction ring 230 is largely shaped as a simple ring, with the addition of a ring traction surface 231 formed on an inner portion, as well as features to mate with preload spring 218 and anti-rotation mechanism 232. These features are described in the figures as holes for pins, splines, or other similar features. Ring traction surface 231 interfaces with one set of slanted inner roller traction surfaces 226 of plurality of planetary rollers 220. Preload spring 218 is located between ring gear 210 and sprung traction ring 230 of ring roller assembly 222. As shown, preload spring 218 is a wave spring, but other types of springs could be used as well. Preload spring 218 deforms as sprung traction ring 230 moves axially towards ring gear 210, and this deformation provides an axial force on sprung traction ring 230 to create preload forces in planetary traction drive 202. Preload spring 218 is shown as shaped as a ring to match the shapes of ring gear 210 and sprung traction ring 230, but other forms or shapes could be used. Preload spring 218 provides a specified amount of preload force on slanted inner roller traction surfaces 226 of plurality of planet rollers 220 during assembly and operation of planetary traction drive 202. This specified amount of preload force generated by preload spring 218 is an amount of preload force that is sufficient to load all traction interfaces in planetary traction drive 202 so that these traction interfaces transmit torque without excessive slipping, enabling operation and torque transfer through planetary traction drive 202. The necessary forces in these traction interfaces can be calculated based on the design and operating specifications of the planetary traction drive 202, and the needed preload force can then be calculated as well to specify an appropriate preload spring 218. Preload spring 218 is designed to push sprung traction ring 230 axially away from ring gear 210, which in turn places the preload forces on slanted inner roller traction surfaces 226 of plurality of planet rollers 220. These preload forces are then transmitted to all traction interfaces in planetary traction drive 202, enabling torque transfer through planetary traction drive 202. Since preload spring 218 can operate over a variable width, it can attain proper preload of planetary traction drive 202 even with variations in manufactured part dimensions and tolerances. Additionally, the variable width of ring roller assembly 222 created by incorporating preload spring 218 can allow for greater ease of assembly of planetary traction drive 202 by providing a narrower profile of ring roller assembly 222 during assembly. In conjunction with preload spring 218, an anti-rotation mechanism 232 is used between sprung traction ring 230 and ring gear 210. Anti-rotation mechanism 232 connects sprung traction ring 230 and ring gear 210 such that sprung traction ring 230 can slide axially on anti-rotation mechanism 232 and anti-rotation mechanism 232 transmits torque between sprung traction ring 230 and ring gear 210. Anti-rotation mechanism 232 can be implemented through a variety of different ways, as described in the figures. Anti-rotation mechanism 232 allows for preload spring 218 to push sprung traction ring 230 axially away from ring gear 210 to obtain preload forces in planetary traction drive 202, while rotationally connecting sprung traction ring 230 and ring gear 210. Ring gear 210 meshes with transfer gear 212 at a low-speed output of planetary traction drive 202, to transmit torque and power to and from engine 116 from FIG. 1.

Also shown in FIG. 2 is an optional ring shim 236 that is inserted between sprung traction ring 230 and ring gear 210 during assembly of planetary traction drive 202. While it is necessary to enable sprung traction ring 230 to slide on anti-rotation mechanism 232, it is beneficial to minimize this sliding distance in order to minimize wear caused by this sliding action. Inserting ring shim 236 that is located between sprung traction ring 230 and ring gear 210 can minimize the operating distance between sprung traction ring 230 and ring gear 210 to limit the sliding distance of sprung traction ring 230 on anti-rotation mechanism 232. This operating distance minimization is especially important when preload spring 218 is combined with an active ball ramp, as described in the figures. Ring shim 236 can be sized in thickness to allow for the required axial motion of sprung traction ring 230, but with additional compression of preload spring 218 will contact both sprung traction ring 230 and ring gear 210 to prevent excessive axial sliding motion of sprung traction ring 230 on anti-rotation mechanism 232. The use of ring shim 236 can also allow for larger clearances during assembly of planetary traction drive 202, then minimizing those clearances during operation. Ring shim 236 may be a single part, or may be comprised of a series of multiple smaller parts that are situated around ring roller assembly 222. Ring shim 236 may take a variety of forms: an annulus ring, a series of pads, or even features formed on sprung traction ring 230 and ring gear 210. Other forms of ring shim 236 are possible as well.

FIG. 3A is a cross section of an embodiment of a planetary traction drive 302 with a preload spring 318 and a ball ramp 340 integrated into the ring roller assembly 322 with the preload spring 318 providing clamping force in the planetary traction drive 302. In this embodiment, ring gear 310 mates with second traction ring 334 through a ball ramp 340. Ring gear 310 mates with sprung traction ring 330 through preload spring 318 and anti-rotation mechanism 332 as described in FIG. 2. Preload spring 318 and ball ramp 340 both function to vary the forces on slanted traction interfaces 338 and shaft traction interfaces 339 of planetary traction drive 302. Preload spring 318 is used to set a preload on slanted inner roller traction surfaces 326 of plurality of planet rollers 320 during assembly and low torque operation of planetary traction drive 302, and ball ramp 340 dynamically varies the forces as planetary traction drive 302 operates, as taught in U.S. Pat. No. 10,655,711, issued May 19, 2020, entitled "Single Angular Contact Ball Ramp For Driven Turbocharger." The use of sprung traction ring 330 with preload spring 318 and second traction ring 334 with ball ramp 340 in ring roller assembly 322 allows for both preload forces to be set in planetary traction drive 302 as well as variable dynamic forces based on torque transmission to enable proper forces on slanted traction interfaces 338 and shaft traction interfaces 339 throughout the operation of planetary traction drive 302. As shown in FIG. 3A, planetary traction drive 302 is operating at a neutral, low torque, or rest position, with preload spring 318 providing the clamping force in planetary traction drive 302 necessary to transmit torque through slanted traction interfaces 338 and shaft traction interfaces 339. Preload spring 318 is designed to provide a sufficient amount of preload force for planetary traction drive 302 to operate without excessive slipping in slanted traction interfaces 338 and shaft traction interfaces 339 while at near-zero torque conditions. Assembly tolerances in planetary traction drive 302 or surface wear of slanted traction interfaces 338 or shaft traction interfaces 339 can be compensated by preload spring 318, which ensures that slanted traction interfaces 338 and shaft traction interfaces 339 do not disconnect and slip. The preload force ensures engagement of slanted traction interfaces 338. Some small amount of slip is normal during operation of the planetary traction drive 302, but the preload spring 318 prevents the slip amount from becoming too large. Sprung traction ring 330 is at or near a nominal axial position on anti-rotation mechanism 332, and as such ring shim 336 is not active in locating sprung traction ring 330. This nominal axial position of sprung traction ring 330 is as assembled, and at a rest position. At this point, the gap between sprung traction ring 330 and ring gear 310 is slightly larger than the thickness of ring shim 336.

FIG. 3B is a cross section of the embodiment of a planetary traction drive 302 from FIG. 3A with a preload spring 318 and a ball ramp 340 integrated into the ring roller assembly 322 with the ball ramp 340 providing clamping force in the planetary traction drive 302. Once torque is applied to planetary traction drive 302, ball ramp 340 actuates, providing additional clamping force through ring roller assembly 322. Until ball ramp 340 actuates under torque throughput through traction drive 302, preload spring 318 generates sufficient preload forces to avoid excessive slip in slanted traction interfaces 338 and shaft traction interfaces 339. Preload spring 318 ensures engagement of slanted traction interfaces 338 and shaft traction interfaces 339 until ball ramp 340 actuates. Some small amount of slip is normal during operation of the planetary traction drive 302, but the preload spring 318 prevents the slip amount from becoming too large. Generally, a normal amount of slip during operation of the planetary traction drive 302 is about 1-2%, and values of slip over 5% should be avoided. Initially, this additional clamping force compresses preload spring 318, causing sprung traction ring 330 to slide axially on anti-rotation mechanism 332 towards ring gear 310. Ring shim 336 is sized to quickly stop axial movement of sprung traction ring 330, to minimize the operating distance that sprung traction ring 330 slides on anti-rotation mechanism 332 to minimize wear from the sliding. Once sprung traction ring 330 moves a sufficient axial distance to compress ring shim 336 between sprung traction ring 330 and ring gear 310 and stops sliding on anti-rotation mechanism 332, ball ramp 340 dynamically provides variable levels of clamping force for planetary traction drive 302 based on the torque throughput of planetary traction drive 302. The variable levels of clamping force provide normal forces in slanted traction interfaces 338 and shaft traction interfaces 339 that are sufficient to transmit the required torque through planetary traction drive 302. FIG. 3B shows ring roller assembly 322 with preload spring 318 in a compressed position, with ring shim 336 locating sprung traction ring 330 axially and ball ramp 340 actuating based on torque transmission through planetary traction drive 302.

FIG. 4 is an exploded view of an embodiment of a ring roller assembly 422 for a planetary traction drive 402 where the anti-rotation mechanism 432 in the ring roller assembly 422 is comprised of a series of dowel pins 450. Sets of holes 452 are machined into both sprung traction ring 430 and ring gear 410 to fit series of dowel pins 450. Mounting sprung traction ring 430 on series of dowel pins 450 allows sprung traction ring 430 to move axially towards and away from ring gear 410, allowing preload spring 418 to set preload forces in planetary traction drive 402, while rotationally coupling sprung traction ring 430 to ring gear 410 so that sprung traction ring 430 and ring gear 410 rotate together and series of dowel pins 450 transmits torque between sprung traction ring 430 and ring gear 410. Series of dowel pins 450 may be comprised of a variety of a number of pins, however, it is important that uniform spacing is used to maintain rotational balance of ring roller assembly 422, although secondary balancing operations may be performed as well if non-uniform spacing is not used. Series of dowel pins 450 may be press fit into ring gear 410 for positive location, and have a close tolerance fit to sprung ring roller 430 to allow axial sliding motion of sprung ring roller 430. Also shown is series of ring shims 436 that fit between sprung traction ring 430 and ring gear 410. The width of series of ring shims 436 can be determined during assembly to limit the operational distance that sprung traction ring 430 slides on anti-rotation mechanism 432 during operation of planetary traction drive 402, when ball ramp 440 actuates during torque transmission through planetary traction drive 402.

Alternatively, spline features 453 formed on sprung traction ring 430 may be used as the anti-rotation mechanism 432. These spline features 453 of sprung traction ring 430 engage with ring gear 410 to lock the rotation of sprung traction ring 430 to ring gear 410. In this alternative embodiment, series of dowel pins 450 function only to hold series of ring shims 436 in place between sprung traction ring 430 and ring gear 410.

FIG. 5 is an exploded view of an embodiment of a ring roller assembly 522 for a planetary traction drive 502 where the anti-rotation mechanism 532 in the ring roller assembly 522 is comprised of a series of shoulder bolts 554. Sprung traction ring 530 is rotated in the view to better show features on sprung traction ring 530. Series of shoulder bolts 554 effectively operate equivalently to series of dowel pins 450 from FIG. 4, but provide positive screw thread engagement into threaded holes 556 in ring gear 510. Sprung traction ring 530 has a series of holes 552 to mount sprung traction ring 530 on series of shoulder bolts 554. Series of shoulder bolts 554 rotationally couple and transmit torque between sprung traction ring 530 and ring gear 510 while allowing sprung traction ring 530 to slide axially on series of shoulder bolts 554 to allow for preload spring 518 to provide preload clamping forces to planetary traction drive 502.

Also shown in FIG. 5 is an optional adjustable step ring shim 564 located between the sprung traction ring 530 and the ring gear 510 to minimize the operating distance between sprung traction ring 530 and ring gear 510 to limit the sliding distance of sprung traction ring 530 on anti-rotation mechanism 532 before sprung traction ring 530 directly contacts ring gear 510. The adjustable step ring shim 564 comprises a series of steps 560 formed on sprung traction ring 530 that mate with a corresponding series of pads 562 formed on ring gear 510, so that when sprung traction ring 530 is rotated during assembly relative to ring gear 510 different discrete shim levels are achieved. Each of the series of steps 560 formed on sprung traction ring 530 includes multiple step features that protrude by a different amount from the inside face of sprung traction ring 530, so that each step level represents a discrete width of sprung traction ring 530. The corresponding series of pads 562 formed on ring gear 510 are uniform protrusions from the face of ring gear 510 that mate with the various step levels of series of steps 560 as sprung traction ring 530 is rotated relative to ring gear 510 during assembly. As the width of sprung traction ring 530 varies according to which step level is selected, the axial operating distance varies between sprung traction ring 530 and ring gear 510. This adjustable step ring shim 564 can be used as an alternative device to the ring shim 236 from FIG. 2 to allow for a variable gap to be set during assembly between sprung traction ring 530 and ring gear 510. The different, discrete steps allow for variation of this gap in order to minimize the sliding distance of sprung traction ring 530 on series of shoulder bolts 554 to minimize wear associated with this sliding. The series of steps 560 and series of pads 562 are formed around the entire circumference of sprung traction ring 530 and ring gear 510 respectively, to provide even spacing and forces through ring roller assembly 522. Multiple sets of series of holes 552 in sprung traction ring 530 can be used that correspond to each level in series of steps 560. The adjustable step ring shim 564 can be used with other embodiments of the invention as well, and is not limited to use with the anti-rotation mechanism 532 comprised of series of shoulder bolts 554.

FIG. 6 is an exploded view of an embodiment of a ring roller assembly 622 for a planetary traction drive 602 where the anti-rotation mechanism 632 in the ring roller assembly 622 is comprised of a splined connection 670 between the sprung traction ring 630 and the ring gear 610. Sprung traction ring 630 is rotated in the view to better show features on sprung traction ring 630. Splines 672 are formed on sprung traction ring 630 and mate with corresponding splines 674 formed on ring gear 610. As shown, splines 672 on sprung traction ring 630 are external splines, and corresponding splines 674 on ring gear are internal splines, but the opposite can be used as well, with internal splines on sprung traction ring 630 and external splines on ring gear 610. Splined connection 670 rotationally couples sprung traction ring 630 to ring gear 610 and transmits torque between sprung traction ring 630 and ring gear 610, while allowing sprung traction ring 630 to slide axially to allow preload spring 618 to set preload forces in planetary traction drive 602.

FIG. 7 is an exploded view of an embodiment of a ring roller assembly 722 for a planetary traction drive 702 where the anti-rotation mechanism 732 in the ring roller assembly 722 is comprised of internal gear teeth 780 formed on the sprung traction ring 730 that mate with ring gear teeth 782 on the ring gear 710. Sprung traction ring 730 is rotated in the view to better show features on sprung traction ring 730. This anti-rotation mechanism 732 is similar to the splined connection 670 of FIG. 6, but utilizes the ring gear teeth 782 that are already present on ring gear 710 to reduce the number of machined features on the parts of ring roller assembly 722. Ring gear teeth 782 can be made wider than necessary to mesh with transfer gear 712, leaving additional gear width 784 available for anti-rotation mechanism 732 to utilize. Sprung traction ring 730 has internal gear teeth 780 formed on it that mate with ring gear teeth 782 on the section of additional gear width 784 of ring gear teeth 782. This method works for spur gears, as they are straight cut, but would not work with helical type or other curved gears. Internal gear teeth 780 rotationally couple sprung traction ring 730 to ring gear 710 and transmit torque between sprung traction ring 730 and ring gear 710 while allowing sprung traction ring 730 to slide axially on ring gear teeth 782 to allow preload spring 718 to provide preload forces in planetary traction drive 702.

FIG. 8 is a cross section of an alternative embodiment off planetary traction drive 802 with a preload spring 818 integrated into a two-piece traction barrel 886 of a sun shaft assembly 804. Planetary traction drive 802 is comprised of a sun shall assembly 804, a plurality of double roller planet rollers 820 with outer roller traction surfaces 824 that interface with sun shaft assembly 804 as well as inner roller traction surfaces 826, and a ring roller assembly 822 comprising a ring gear 810 as well as a first traction ring 830 and a second traction ring 834 located concentrically with ring gear 810 that interface with inner roller traction surfaces 826 of plurality of double roller planet rollers 820. Sun shaft assembly 804 is comprised of a center shaft 805 and a two-piece traction barrel 886 located around center shaft 805. Two-piece traction barrel 886 is comprised of a first traction barrel piece 887 with a first slanted barrel traction surface 888 that is connected to center shaft 805, a sprung traction barrel piece 889 with a second slanted barrel traction surface 890 that is coupled to first traction barrel piece 887 through an anti-rotation mechanism 832, and a preload spring 818 located between first traction barrel piece 887 and sprung traction barrel piece 889. Anti-rotation mechanism 832 allows sprung traction barrel piece 889 to slide axially on anti-rotation mechanism 832 and transmits torque between sprung traction barrel piece 889 and first traction barrel piece 887. Preload spring 818 provides a specified amount of preload force on first slanted barrel traction surface 888 and second slanted barrel traction surface 890 during assembly and operation of planetary traction drive 802 so that planetary traction drive 802 transmits torque properly during operation. Preload spring 818 pushes sprung traction barrel piece 889 axially away from first traction barrel piece 887, which increases the normal forces on first slanted barrel traction surface 888 and second slanted barrel traction surface 890 as they push into outer roller traction surfaces 824 of plurality of double roller planet rollers 820. This in turn increases the normal forces between inner roller traction surfaces 826 of plurality of double roller planet rollers 820 and first traction ring 830 and second traction ring 834. The spring rate of preload spring 818 is designed to provide sufficient forces in planetary traction drive 802 for planetary traction drive 802 to transmit torque.

As shown in FIG. 8, anti-rotation mechanism 832 may be comprised of a splined connection 870 between first traction barrel piece 887 and sprung traction barrel piece 889, which rotationally couples first traction barrel piece 887 and sprung traction barrel piece 889 and transmits torque between first traction barrel piece 887 and sprung traction barrel piece 889 while allowing sprung traction barrel piece 889 to slide axially to allow preload spring 818 to provide preload forces in planetary traction drive 802. Other implementations of anti-rotation mechanism 832 may be used as well, such as those taught in previous figures. Also shown in FIG. 8 is an optional ball ramp 840 located between ring gear 810 and second traction ring 834. Ring gear 810 mates with second traction ring 834 through ball ramp 840 in the same way as described in FIGS. 3A and 3B. Ball ramp 840 provides dynamic variable clamping forces in planetary traction drive 802 based on torque through planetary traction drive 802. In this way, preload spring 818 provides clamping forces in planetary traction drive 802 during rest and low torque operation of planetary traction drive 802, and ball ramp 840 provides clamping forces in planetary traction drive 802 during moderate and high torque operation of planetary traction drive 802.

Figure 9:
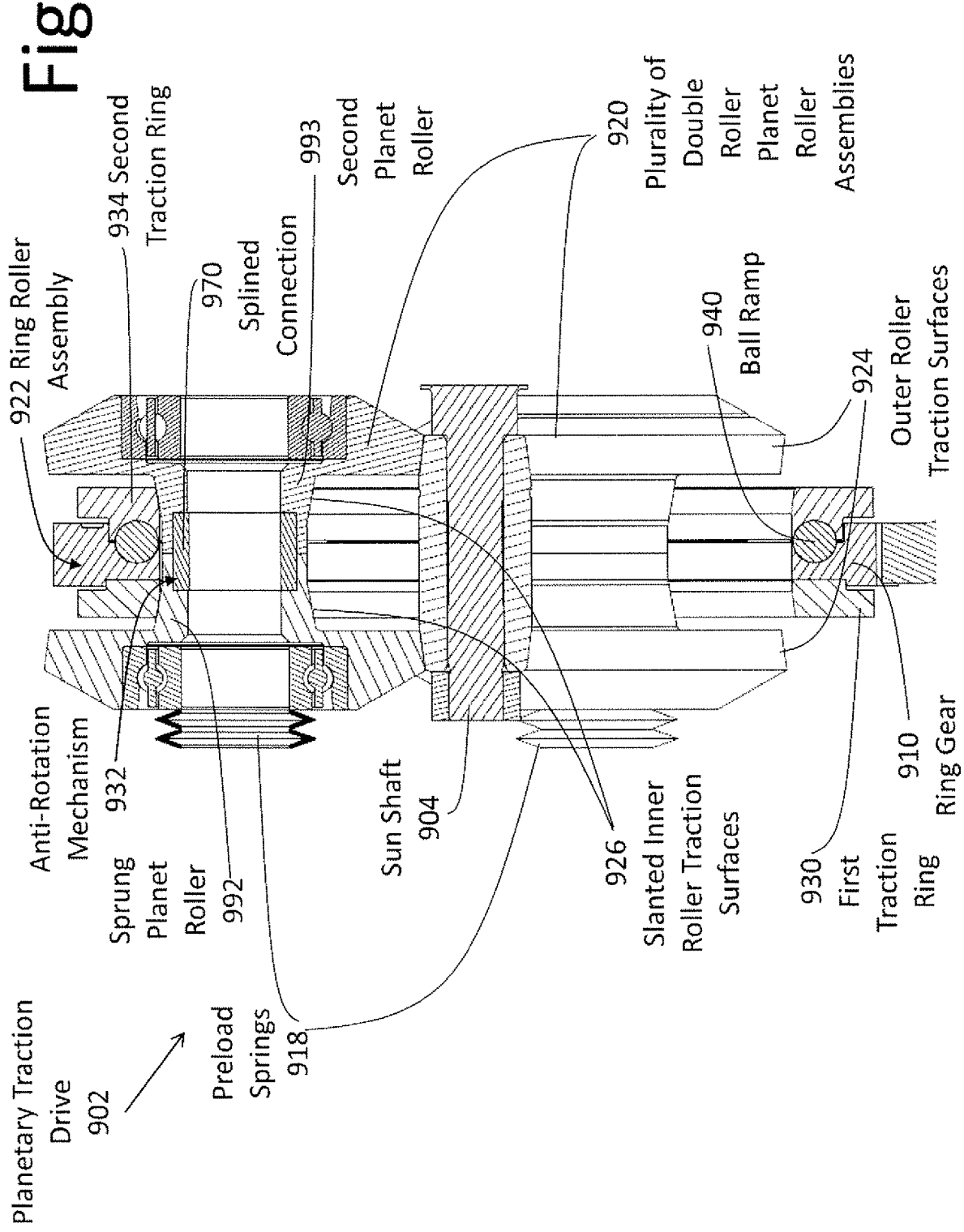
FIG. 9 is a cross section of an alternative embodiment of a planetary traction drive with preload springs integrated into a plurality of double roller planet roller assemblies.

FIG. 9 is a cross section of an alternative embodiment of a planetary traction drive 902 with preload springs 918 integrated into a plurality of double roller planet roller assemblies 920. Planetary traction drive 902 is comprised of a sun shaft 904, a plurality of double roller planet roller assemblies 920, and a ring roller assembly 922. As shown, three double roller planet roller assemblies 920 may be used, but other numbers of double roller planet roller assemblies 920 may be used as well. Each double roller planet roller assembly 920 is comprised of a sprung planet roller 992 and a second planet roller 993 rotationally coupled together concentrically through an anti-rotation mechanism 932 that allows sprung planet roller 992 to slide axially on anti-rotation mechanism 932 while transmitting torque between sprung planet roller 992 and second planet roller 993, where both sprung planet roller and second planet roller have outer roller traction surfaces 924 that interface with sun shaft 904 as well as slanted inner roller traction surfaces 926, and a preload spring 918 located externally to said sprung planet roller 992 that provides a specified amount of preload force on slanted inner roller traction surfaces 926 of sprung planet roller 992 and second planet roller 993 during assembly and operation of planetary traction drive 902. Ring roller assembly 922 is comprised of a ring gear 910, and a first traction ring 930 and a second traction ring 934 located concentrically with ring gear 910 that interface with slanted inner roller traction surfaces 926 of sprung planet rollers 992 and second planet rollers 993 of plurality of double roller planet roller assemblies 920. For each of the plurality of double roller planet roller assemblies 920, a preload spring 918 is located externally to the sprung planet roller 992 so that preload springs 918 push sprung planet rollers 992 axially inward towards ring roller assembly 922, which generates normal forces on slanted inner roller traction surfaces 926 of sprung planet rollers 992 and second planet rollers 993 as ring roller assembly 922 is effectively sandwiched between sprung planet rollers 992 and second planet rollers 993. This provides preload clamping forces for all traction interfaces in planetary traction drive 902, enabling torque transfer and proper operation.

Also shown in FIG. 9 is an optional ball ramp 940 located in ring roller assembly 922. Ring gear 910 mates with second traction ring 934 through ball ramp 940 to provide dynamic, torque-based loading of the planetary traction drive 902. Preload springs 918 in plurality of double roller planet roller assemblies 920 provide preload clamping forces for at rest and low torque operation of planetary traction drive 902, and ball ramp 940 provides dynamic clamping forces for medium and high torque operation of planetary traction drive 902. Additionally, anti-rotation mechanism 932 may be comprised of a splined connection 970 between sprung planet roller 992 and second planet roller 993 as shown, but other implementations of anti-rotation mechanism 932 may be used as well.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:
1. A planetary traction drive comprising:
a sun shaft;
a plurality of planet rollers with outer roller traction surfaces that interface with said sun shaft;
a ring roller assembly comprising:
a ring gear;

a sprung traction ring and a second traction ring located concentrically with said ring gear that interface with slanted inner roller traction surfaces of said plurality of planet rollers;

a preload spring located between said ring gear and said sprung traction ring that provides a preload force on said slanted inner roller traction surfaces of said plurality of planet rollers during assembly and operation of said planetary traction drive;

an anti-rotation mechanism that connects said sprung traction ring and said ring gear such that said sprung traction ring can slide axially on said anti-rotation mechanism wherein said anti-rotation mechanism transmits torque between said sprung traction ring and said ring gear.

2. The planetary traction drive of claim 1 where said anti-rotation mechanism is comprised of a series of dowel pins.

3. The planetary traction drive of claim 1 where said anti-rotation mechanism is comprised of spline features formed on said sprung traction ring that engage with said ring gear.

4. The planetary traction drive of claim 1 where said anti-rotation mechanism is comprised of a series of shoulder bolts.

5. The planetary traction drive of claim 1 where said anti-rotation mechanism is comprised of a splined connection between said sprung traction ring and said ring gear.

6. The planetary traction drive of claim 1 where said anti-rotation mechanism is comprised of internal gear teeth formed on said sprung traction ring that mate with ring gear teeth on said ring gear.

7. The planetary traction drive of claim 1 further comprising:
at least one ring shim located between said sprung traction ring and said ring gear to minimize the operating distance between said sprung traction ring and said ring gear to limit the sliding distance of said sprung traction ring on said anti-rotation mechanism.

8. The planetary traction drive of claim 1 further comprising:
an adjustable step ring shim located between said sprung traction ring and said ring gear to minimize the operating distance between said sprung traction ring and said ring gear to limit the sliding distance of said sprung traction ring on said anti-rotation mechanism before said sprung traction ring directly contacts said ring gear, said adjustable step ring shim comprising:
a series of steps formed on said sprung traction ring that mate with a corresponding series of pads formed on said ring gear, so that when said sprung traction ring is rotated relative to said ring gear different discrete shim levels are achieved.

9. The planetary traction drive of claim 1 where said ring gear mates with said second traction ring through a ball ramp.

10. The planetary traction drive of claim 1 further comprising:
a turbine and a compressor attached to said sun shaft and a transmission coupled to said ring gear to form a driven turbocharger.

11. A method of setting a preload in a planetary traction drive comprising:
interfacing outer roller traction surfaces of a plurality of planet rollers with a sun shaft;
assembling a ring roller assembly comprising a ring gear, a sprung traction ring, and a second traction ring;
interfacing said sprung traction ring and said second traction ring with slanted inner roller traction surfaces of said plurality of planet rollers;

placing a preload spring between said ring gear and said sprung traction ring that provides a preload force on said slanted inner roller traction surfaces of said plurality of planet rollers during assembly and operation of said planetary traction drive;

connecting said sprung traction ring and said ring gear through an anti-rotation mechanism such that said sprung traction ring can slide axially on said anti-rotation mechanism wherein said anti-rotation mechanism transmits torque between said sprung traction ring and said ring gear.

12. The method of claim 11 where said anti-rotation mechanism is comprised of a series of dowel pins.

13. The method of claim 11 where said anti-rotation mechanism is comprised of spline features formed on said sprung traction ring that engage with said ring gear.

14. The method of claim 11 where said anti-rotation mechanism is comprised of a series of shoulder bolts.

15. The method of claim 11 where said anti-rotation mechanism is comprised of a splined connection between said sprung traction ring and said ring gear.

16. The method of claim 11 where said anti-rotation mechanism is comprised of internal gear teeth formed on said sprung traction ring that mate with ring gear teeth on said ring gear.

17. The method of claim 11 further comprising:
placing at least one ring shim between said sprung traction ring and said ring gear to minimize the operating distance between said sprung traction ring and said ring gear to limit the sliding distance of said sprung traction ring on said anti-rotation mechanism.

18. The method of claim 11 further comprising:
locating an adjustable step ring shim between said sprung traction ring and said ring gear to minimize the operating distance between said sprung traction ring and said ring gear to limit the sliding distance of said sprung traction ring on said anti-rotation mechanism before said sprung traction ring directly contacts said ring gear, said adjustable step ring shim comprising:
a series of steps formed on said sprung traction ring that mate with a corresponding series of pads formed on said ring gear, so that when said sprung traction ring is rotated relative to said ring gear different discrete shim levels are achieved.

19. The method of claim 11 where said ring gear mates with said second traction ring through a ball ramp.

20. The method of claim 11 further comprising:
attaching a turbine and a compressor to said sun shaft and coupling a transmission to said ring gear to form a driven turbocharger.

21. A planetary traction drive comprising:
a sun shaft assembly comprising:
a center shaft;
a two-piece traction barrel located around said center shaft and concentric to said center shaft and connected to rotate with said center shaft, said two-piece traction barrel comprising:
a first traction barrel piece with a first slanted barrel traction surface that is connected to said center shaft;
a sprung traction barrel piece with a second slanted barrel traction surface that is coupled to said first traction barrel piece through an anti-rotation mechanism that allows said sprung traction barrel piece to slide axially on said anti-rotation mechanism and transmit torque between said sprung traction barrel piece and said first traction barrel piece;

a preload spring located between said first traction barrel piece and said sprung traction barrel piece that provides a preload force on said first slanted barrel traction surface and said second slanted barrel traction surface during assembly and operation of said planetary traction drive;

a plurality of double roller planet rollers with outer roller traction surfaces that interface with said first slanted barrel traction surface and said second slanted barrel traction surface of said sun shaft assembly;

a ring roller assembly comprising:
 a ring gear;
 a first traction ring and a second traction ring located concentrically with said ring gear that interface with inner roller traction surfaces of said plurality of double roller planet rollers.

22. The planetary traction drive of claim 21 where said anti-rotation mechanism is comprised of a splined connection between said first traction barrel piece and said sprung traction barrel piece.

23. The planetary traction drive of claim 21 where said ring gear mates with said second traction ring through a ball ramp.

24. The planetary traction drive of claim 21 further comprising:
a turbine and a compressor attached to said center shaft of said sun shaft assembly and a transmission coupled to said ring gear to form a driven turbocharger.

25. A planetary traction drive comprising:
a sun shaft;
a plurality of double roller planet roller assemblies, each double roller planet roller assembly comprising:
 a sprung planet roller and a second planet roller rotationally coupled together concentrically through an anti-rotation mechanism that allows said sprung planet roller to slide axially on said anti-rotation mechanism while transmitting torque between said sprung planet roller and said second planet roller, where both sprung planet roller and second planet roller have outer roller traction surfaces that interface with said sun shaft, as well as slanted inner roller traction surfaces;
 a preload spring located externally to said sprung planet roller that provides a preload force on said slanted inner roller traction surfaces of said sprung planet roller and said second planet roller during assembly and operation of said planetary traction drive;
a ring roller assembly comprising:
 a ring gear;
 a first traction ring and a second traction ring located concentrically with said ring gear that interface with said slanted inner roller traction surfaces of said sprung planet rollers and said second planet rollers of said plurality of double roller planet roller assemblies.

26. The planetary traction drive of claim 25 where said anti-rotation mechanism is comprised of a splined connection between said sprung planet roller and said second planet roller.

27. The planetary traction drive of claim 25 where said ring gear mates with said second traction ring through a ball ramp.

28. The planetary traction drive of claim 25 further comprising:
a turbine and a compressor attached to said sun shaft and a transmission coupled to said ring gear to form a driven turbocharger.

* * * * *